2 Sheets—Sheet 1.

D. & C. GARVER.

Bag-Holder.

No. 8,625. Reissued Mar. 18, 1879.

WITNESSES:

W. W. Hollingsworth

Edw. W. Byrn.

INVENTOR:

D. Garver

C. Garver

BY

ATTORNEYS.

N. PETERS, PHOTO-LITHOGRAPHER, WASHINGTON, D. C.

D. & C. GARVER

Bag-Holder.

No. 8,625. Reissued Mar. 18, 1879.

WITNESSES:

W. W. Hollingsworth

Edwd. W. Byrn

INVENTOR:

D. Garver

C. Garver

BY

ATTORNEYS.

N. PETERS, PHOTO-LITHOGRAPHER, WASHINGTON, D. C.

UNITED STATES PATENT OFFICE.

DANIEL GARVER AND CYRUS GARVER, OF LEITERSBURG, MARYLAND.

IMPROVEMENT IN BAG-HOLDERS.

Specification forming part of Letters Patent No. 161,501, dated March 30, 1875; Reissue No. 8,625, dated March 18, 1879; application filed December 10, 1878.

*To all whom it may concern:*

Be it known that we, DANIEL GARVER and CYRUS GARVER, of Leitersburg, in the county of Washington and State of Maryland, have invented a new and Improved Bag-Holder Attachment to Grain-Separators; and we do hereby declare that the following is a full, clear, and exact description of the same, reference being had to the accompanying drawings, forming part of this specification, in which—

Figure 1:
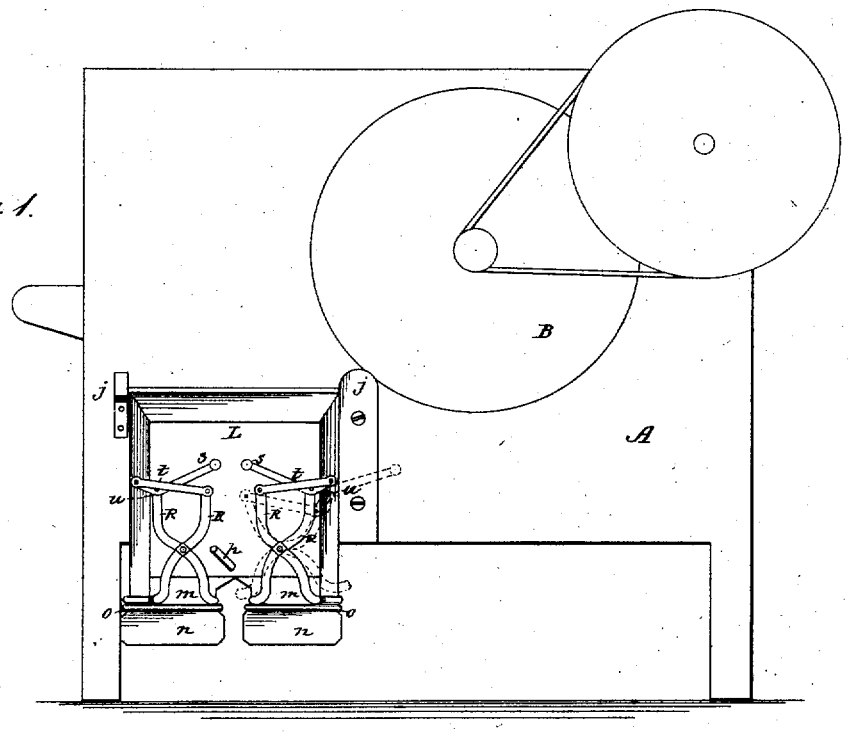
Figure 2:
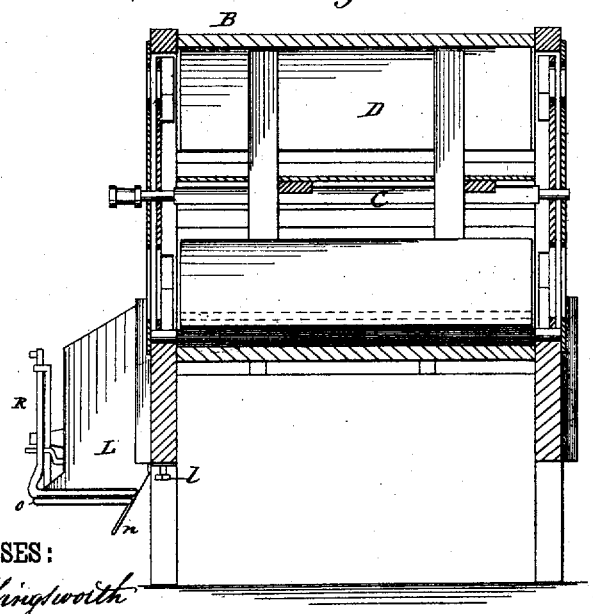
Figure 3:
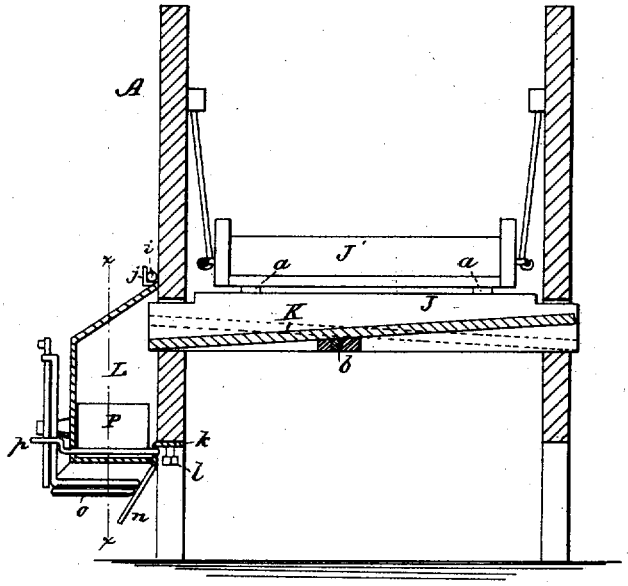
Figure 4:
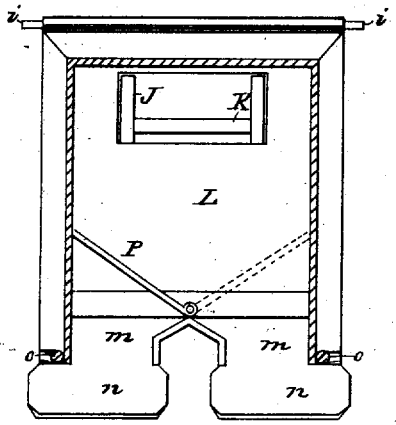
Figure 5:
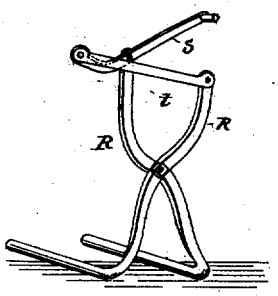

Figure 1 is a side elevation of a grain-separator, showing, in front view, the bag-holding devices. Fig. 2 is a vertical cross-section, showing a side view of the bag-holding devices. Fig. 3 is a vertical cross-section through the separator and bag-holding devices. Fig. 4 is a detail sectional view of the bagging-box, taken through the line *x x* of Fig. 3. Fig. 5 is a detail perspective view of the bag-clamping devices.

Our invention relates to certain improvements in bag-holder attachments for grain-separators designed to permit the grain to be bagged in consecutive operation with the cleaning of the same from the impurities mixed therewith.

The improvements consist in the particular construction and arrangement of devices for holding the bag and locking the clamping-levers to their holding position, and in the peculiar construction of the bottom portion of the bagging-box, all as hereinafter more fully described.

In the drawings, A represents the frame of a grain-separator, constructed in any of the known and usual ways. B is the fan-case, C the fan-shaft, and D the fan. J is a transverse trough, whose sides are rigidly attached to the shoe J′ of the grain-separator by brackets *a*. (See Fig. 3.) This trough receives the cleaned grain from the separator, and discharges it into the bagging-box. The bottom K of the trough is hinged at or near its middle by means of a rod or bolt, *b*, passing through the said bottom and sides of the trough, so that it can be conveniently adjusted to form an inclined plane dipping toward either side of the separator, to discharge the grain to either side of the same, as may be desired. The adjustment of this bottom may be maintained and held fixed by tightening the nut or thumb-screw on the end of the pivotal rod or bolt *b*.

L represents the box receiving the grain or seed from the trough J, which box may be attached to either side of the machine by the projecting pins *i i* at the upper ends of both sides, (see Fig. 4,) which are fitted in suitable hooks, sockets, or bearings *j j*, Figs. 1 and 3, attached to the frame A. From the under side of the box there projects an ear, *k*, Fig. 3, through which a set-screw, *l*, is passed for securing the box to the frame of the machine. This set-screw binds against the bottom edge of the sides of the separator, and effectually prevents the rising of the pins *i* in their seats *j* and the dislocation of the box.

The box L is provided with two discharge-openings, *m m*, the rear or inner side of each of which is formed of an inclined apron or extension, *n*, projecting below the other three sides of the openings, and widened, as shown in Figs. 1 and 4. This apron or widened extension, by distending the bag at the back part and conducting the grain down past the edge of the bag, prevents the wasting of the same from over the rear edge. Between the two openings *m m*, within the box L, is pivoted a valve or cut-off, P, (see Fig. 4,) which may be thrown to either side to close one opening and form an inclined plane for directing the grain through the other opening after the first bag has been filled. This valve is turned from the outside of the box by means of a handle, *p*.

About the lower edge of each of the discharge-openings *m* we form upon the front and two sides a marginal enlargement, *o*, in the nature of a flaring skirt or flange, terminated by a bead. Over this enlargement the edges of the bag are distended, and secured by the clamping-levers R R. Above the centers of each opening *m*, on the outside of the box L, are arranged these two clamping-levers, which are crossed and pivoted at or near their middle parts. The lower ends of these levers are bent inward to correspond to the flange or bead on the extremity of the discharge-opening, and they fit closely above the same, so as to retain the bag, whose edge is clamped between the said arms and the marginal bead or flange, the inward crimp or bend given to the edge of the bag between the bead and the clamping-arms serving to more effectually hold the bag against slipping off. To the upper end of one of the levers R is pivoted a lever, S, the lower or shorter end of which is connected by a link, *t*, to the upper end of the other lever.

It will be seen that by throwing the handle of lever S outward, as shown in dotted lines in Fig. 1, the lower ends of the levers R R are thrown apart and away from the mouth of the opening *m*, so that the bag may be drawn over said mouth and apron *n*. Now, by throwing the handle of lever S inward, the lower bent arms of levers R R are thrown against the mouth immediately above the bead or flange, so as to clamp the edges of the bag. When the bag is secured in this way it will be seen that the outer pivotal connection of lever S and rod *t* rises above the dead-center *u* at the top of the lever R, thereby locking the clamping-levers in their embrace of the bag.

When one bag is filled the valve P is turned to fill the other bag, and the bag first filled is removed and its place supplied by an empty one, and so on.

In defining the scope of our invention with respect to the clamping-levers for holding the bag, we are aware that a set of right-angular arms have been arranged to hold a bag by pressing the same outwardly against lugs, the said arms being operated by a lever made rigid therewith. We therefore only claim our right-angular clamping-arms when arranged to press inwardly upon the box by a separately-pivoted lever, or lever made separate from the clamping-arms, and arranged to bring the same together by a link-connection, so as to lock past the dead-center.

Having thus described our invention, what we claim is—

1. The discharge-spout, in combination with the pivoted levers having angular clamping-arms arranged upon opposite sides of the spout, together with a separately-pivoted operating-handle and a link-connection, the latter being so arranged and attached to the lever as to draw the clamping-levers together and lock them by a movement past the dead-center, substantially as described.

2. The combination, with the discharge-spout, of the angular levers R R, crossed and pivoted at or near their centers, together with the lever S and connecting-rod *t*, as and for the purpose described.

3. The discharge-spout of a bagging device, having an apron or skirt in the rear extended below the margin of the spout, and made wider than the same, substantially as and for the purpose described.

DANIEL GARVER.
CYRUS GARVER.

Witnesses:
JACOB H. COWLES,
W. S. WILLIAMSON.